United States Patent
Drolet et al.

(10) Patent No.: US 12,025,060 B2
(45) Date of Patent: Jul. 2, 2024

(54) METHOD AND SYSTEM FOR OPERATING AN ENGINE TO PREVENT HIGH POWER ENGINE SURGES

(71) Applicant: PRATT & WHITNEY CANADA CORP., Longueuil (CA)

(72) Inventors: Martin Drolet, Saint-Amable (CA); Yves Cloutier, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 149 days.

(21) Appl. No.: 17/324,404

(22) Filed: May 19, 2021

(65) Prior Publication Data

US 2022/0372920 A1    Nov. 24, 2022

(51) Int. Cl.
  *F02C 9/28*    (2006.01)
  *F02C 7/36*    (2006.01)

(52) U.S. Cl.
  CPC .......... *F02C 9/28* (2013.01); *F02C 7/36* (2013.01); *F05D 2220/323* (2013.01); *F05D 2270/021* (2013.01); *F05D 2270/101* (2013.01); *F05D 2270/3011* (2013.01);
  (Continued)

(58) Field of Classification Search
  CPC ...... F02C 9/00; F02C 9/28; F02C 7/36; F05D 2270/021; F05D 2270/10; F05D 2270/44; F05D 2270/71; F05D 2270/101; F05D 2270/301; F05D 2270/303; F05D 2270/306; F05D 2270/3011; F05D 2270/3013; F05D 2270/3061; F05D 2220/323
  See application file for complete search history.

(56) References Cited

U.S. PATENT DOCUMENTS 2,741,919 A  *  4/1956  Gaubatz ................... G01K 5/32
                                                                374/E5.019
4,217,754 A      8/1980  Schmidt-Roedenbeck et al.
                    (Continued)

FOREIGN PATENT DOCUMENTS

EP           2900986 B1    6/2014
WO    WO-2015117791 A1  *  8/2015  ............... F02C 9/00

OTHER PUBLICATIONS

Philip P. Walsh and Paul Fletcher, "Gas Turbine Performance," © 1998, 2004 by Blackwell Science Ltd (Year: 1998).*
(Continued)

*Primary Examiner* — David P. Olynick
(74) *Attorney, Agent, or Firm* — Norton Rose Fulbright Canada LLP (57) ABSTRACT

Methods and systems for operating an aircraft engine having a compressor are described. The method comprises determining, based on actual operating parameters of the aircraft engine, a compressor mass flow limit for an aerodynamic stability of the aircraft engine; determining an actual compressor mass flow of the compressor of the aircraft engine, wherein the actual compressor mass flow is based on measured values of the aircraft engine; comparing the actual compressor mass flow to the compressor mass flow limit; and governing operation of the aircraft engine to cause an alternative compressor mass flow when the actual compressor mass flow reaches or is anticipated to reach the compressor mass flow limit.

10 Claims, 8 Drawing Sheets

(52) U.S. Cl.
CPC ............... *F05D 2270/303* (2013.01); *F05D 2270/3061* (2013.01); *F05D 2270/71* (2013.01)

(56) References Cited

U.S. PATENT DOCUMENTS

| | | | | |
|---|---|---|---|---|
| 4,309,871 | A * | 1/1982 | Venema | F04D 27/0261 417/43 |
| 5,394,689 | A * | 3/1995 | D'Onofrio | F02C 9/28 60/204 |
| 5,397,181 | A * | 3/1995 | McNulty | G01K 13/02 73/112.05 |
| 6,364,602 | B1 * | 4/2002 | Andrew | F01D 25/007 415/49 |
| 7,762,084 | B2 | 7/2010 | Martis et al. | |
| 8,459,038 | B1 * | 6/2013 | Lickfold | F02K 3/025 60/773 |
| 8,661,832 | B2 | 3/2014 | Griffin et al. | |
| 9,556,798 | B2 | 1/2017 | Ekanayake et al. | |
| 10,047,757 | B2 | 8/2018 | Srivastava et al. | |
| 2003/0131605 | A1 | 7/2003 | Meisner | |
| 2011/0054704 | A1 * | 3/2011 | Karpman | F02C 9/28 700/282 |
| 2014/0093350 | A1 * | 4/2014 | Meisner | F01D 17/08 415/17 |
| 2021/0040900 | A1 * | 2/2021 | Panov | F02C 9/28 |
| 2021/0095606 | A1 | 4/2021 | Halbe et al. | |

OTHER PUBLICATIONS

Joachim Kurzke • Ian Halliwell, "Propulsion and Power an Exploration of Gas Turbine Modeling," © Springer International Publishing AG, part of Springer Nature 2018. (Year: 2018).*

Mark Anderson, "Performance Corrections for Compressor Maps," Concepts NREC, Mar. 29, 2019, downloaded Jul. 14, 2023. (Year: 2019).*

European Patent Office, Communication re. extended European search report for European patent application No. 22174412.1, dated Nov. 22, 2022.

* cited by examiner

METHOD AND SYSTEM FOR OPERATING AN ENGINE TO PREVENT HIGH POWER ENGINE SURGES

TECHNICAL FIELD

The present disclosure relates generally to gas turbine engines, and more particularly to engine compressor surge margins.

BACKGROUND

In an engine having a compressor, continuous inlet air is compressed, mixed with fuel in an inflammable proportion, and exposed to an ignition source to ignite the mixture, which then continues to burn to produce combustion products. The combustion of the air-fuel mixture can be used to power various mechanical components, which in turn can be used to produce thrust.

Compressors found in aircraft engines have an inherent aerodynamic stability limit that when reached, can lead to engine stall/surge. This is an undesired behavior and as such, improvements are desired.

SUMMARY

In accordance with a broad aspect, there is provided a method for operating an aircraft engine having a compressor. The method comprises determining, based on actual operating parameters of the aircraft engine, a compressor mass flow limit for an aerodynamic stability of the aircraft engine; determining an actual compressor mass flow of the compressor of the aircraft engine, wherein the actual compressor mass flow is based on measured values of the aircraft engine; comparing the actual compressor mass flow to the compressor mass flow limit; and governing operation of the aircraft engine to cause an alternative compressor mass flow when the actual compressor mass flow reaches or is anticipated to reach the compressor mass flow limit.

In accordance with another broad aspect, there is provided a system for operating an aircraft engine having a compressor. The system comprises a processing unit, and a non-transitory computer-readable medium. The computer-readable medium has stored thereon instructions which are executable by the processing unit for determining, based on actual operating parameters of the aircraft engine, a compressor mass flow limit for an aerodynamic stability of the aircraft engine; determining an actual compressor mass flow of the compressor of the aircraft engine, wherein the actual compressor mass flow is based on measured values of the aircraft engine; comparing the actual compressor mass flow to the compressor mass flow limit; and governing operation of the aircraft engine to cause an alternative compressor mass flow when the actual compressor mass flow reaches or is anticipated to reach the compressor mass flow limit.

Features of the systems, devices, and methods described herein may be used in various combinations, in accordance with the embodiments described herein. In particular, any of the above features may be used alone, together in any suitable combination, and/or in a variety of arrangements, as appropriate.

BRIEF DESCRIPTION OF THE DRAWINGS

Reference is now made to the accompanying figures in which.

It will be noted that throughout the appended drawings, like features are identified by like reference numerals.

DETAILED DESCRIPTION

The present disclosure is directed to managing the aerodynamic stability of an aircraft engine in order to certain unintended engine disturbances such as engine stalls or surges. An engine surge is a breakdown of airflow in the compressor, causing airflow reversal towards the front of the engine. An engine stall (also referred to as a compressor stall) is characterized by localized pockets of disrupted airflow as the compressor reaches its maximum pressure ratio for a given operating condition. Engine stalls and/or surges at low power are undesirable, but are generally mild since the level of energy in the compressor is relatively low. These events at high power, on the other hand, can have important consequences. As such, there are described herein methods and systems for operating an aircraft engine to prevent high power engine disturbances while optimizing engine operability and performance. These methods and systems are applicable to any type of engine having a compressor, such as but not limited to gas turbine engines, hybrid engines, compound engines, and the like.

Figure 1:
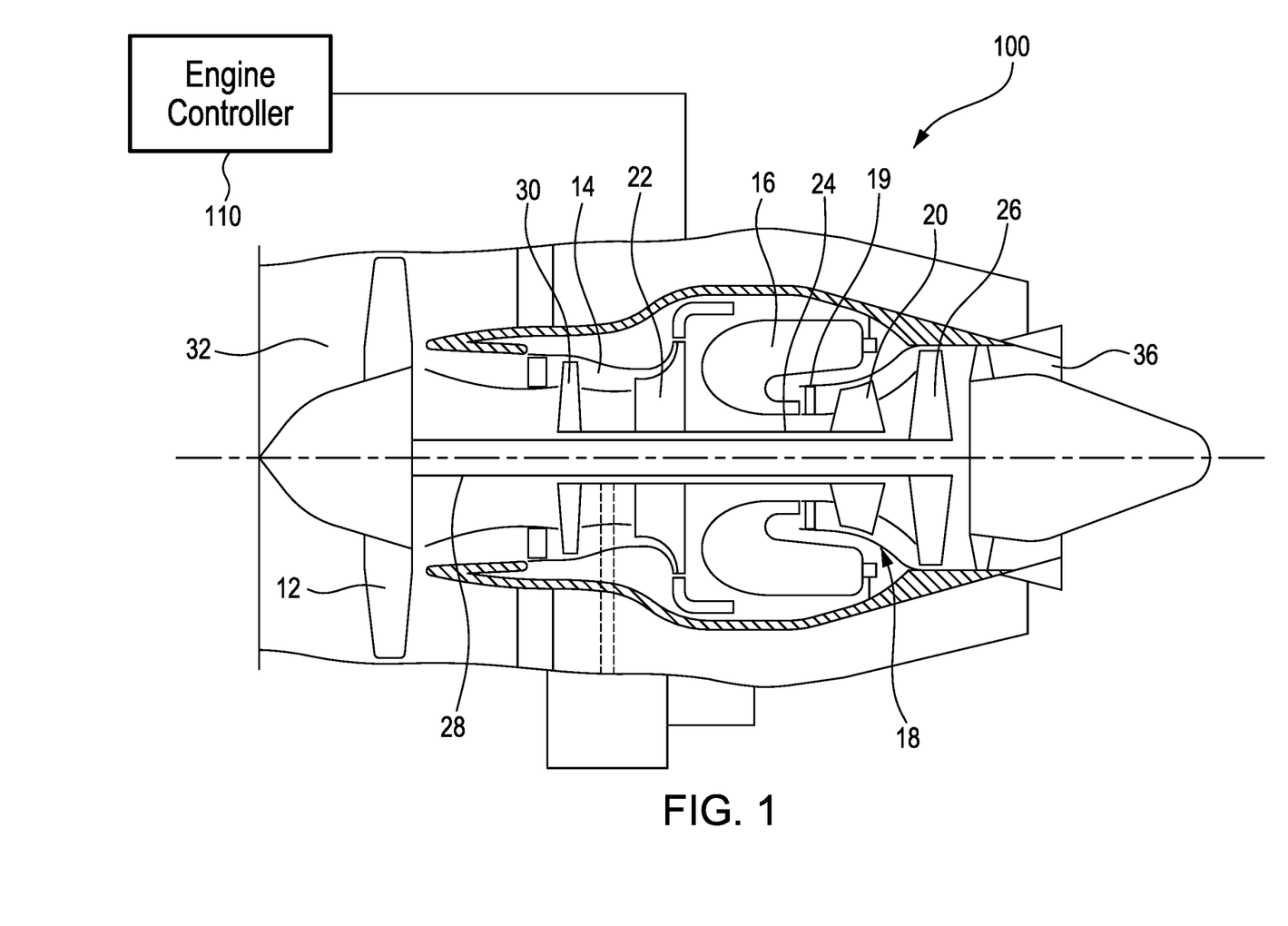
FIG. 1 is a schematic cross-sectional view of an example gas turbine engine.

FIG. 1 illustrates an example gas turbine engine 100 of a type provided for use in subsonic flight. Although illustrated as a turbofan engine, the gas turbine engine 100 may alternatively be another type of engine, for example a turboshaft engine or a turboprop engine. The engine 100 generally comprises in serial flow communication, a fan 12 through which ambient air is propelled toward an inlet 32, a compressor section 14 for pressurizing the air, a combustor 16 in which the compressed air is mixed with fuel and ignited for generating an annular stream of hot combustion gases, and a turbine section 18 for extracting energy from the combustion gases, which exit via an exhaust 36. High-pressure rotor(s) of the turbine section 18 (referred to as "HP turbine rotor(s) 20") are drivingly engaged to high-pressure rotor(s) of the compressor section 14 (referred to as "HP compressor rotor(s) 22") through a high-pressure shaft 24. The turbine section 18 includes a vane 19 between the combustor 16 and the HP turbine rotor(s) 20. Low-pressure rotor(s) of the turbine section 18 (referred to as "LP turbine rotor(s) 26") are drivingly engaged to the fan rotor 12 and to low-pressure rotor(s) of the compressor section 14 (referred to as "LP compressor rotor(s) 30") through a low-pressure shaft 28 extending within the high-pressure shaft 24 and rotating independently therefrom.

Control of the operation of the engine 100 can be effected by one or more control systems, for example an engine controller 110, which is communicatively coupled to the engine 100. The engine controller 110 can modulate a fuel flow provided to the engine 100, the position and orientation of variable geometry mechanisms within the engine 100, a bleed level of the engine 100, and the like, based on predetermined schedules or algorithms. In some embodiments, the engine controller 110 includes one or more FADEC(s), electronic engine controller(s) (EEC(s)), or the like, that are programmed to control the operation of the engine 100. The operation of the engine 100 can be controlled by way of one or more actuators, mechanical linkages, hydraulic systems, and the like. The engine controller 110 can be coupled to the actuators, mechanical linkages, hydraulic systems, and the like, in any suitable fashion for effecting control of the engine 100.

Figure 2:
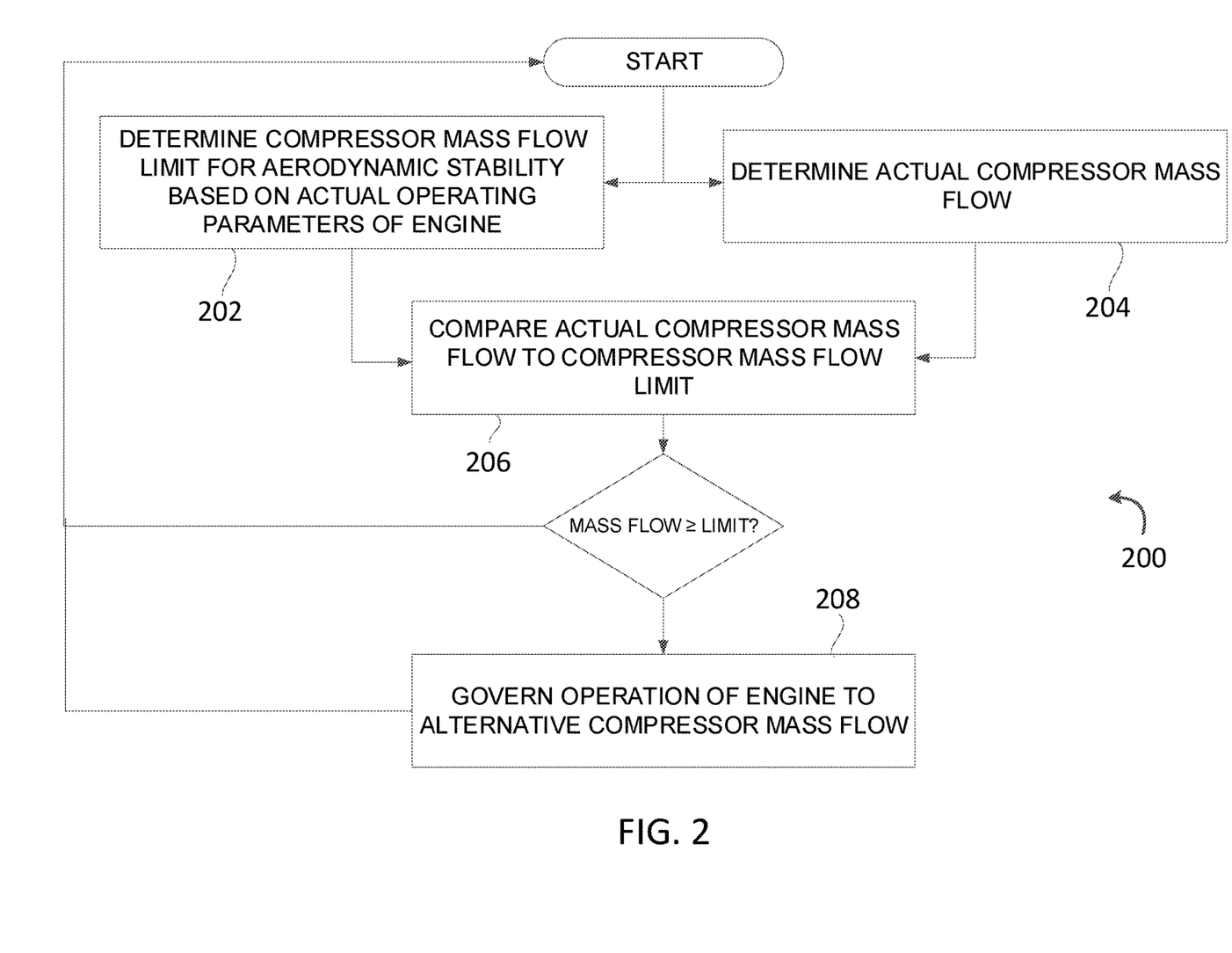
FIG. 2 is a flowchart of an example method for operating aircraft engine.

With reference to FIG. 2, there is illustrated an example of a method 200 for operating an aircraft engine, such as the engine 100. At step 202, a compressor mass flow limit is determined based on actual operating parameters of the aircraft engine. The compressor mass flow limit refers to a minimum mass flow of the compressor to maintain aerodynamic stability of the engine, and is intended to encompass a "corrected mass flow limit" and an "uncorrected mass flow limit", as will be explained in more detail below. The compressor mass flow limit is determined based on a relationship between compressor mass flow and certain operating parameters of the engine, such as pressure, temperature, and engine rotational speed. In some embodiments, the compressor mass flow limit is for the outlet of the compressor. Concurrently with step 202 or sequentially thereto, an actual compressor mass flow is determined at step 204. The actual compressor mass flow is determined from values that are measured and are not theoretical or assumed. As such, the actual compressor mass flow depends on actual measured values of the aircraft engine. It will be understood that the actual compressor mass flow and the compressor mass flow limit used for the method 200 are of a same nature, i.e. if the compressor mass flow limit is for a corrected mass flow, then the actual compressor mass flow is also a corrected mass flow. Similarly, if the compressor mass flow limit is for an outlet of the compressor, then the actual compressor mass flow is the mass flow at the outlet of the compressor. In some embodiments, steps 202 and 204 use the corrected mass flow at the outlet of the compressor.

At step 206, the actual compressor mass flow is compared to the compressor mass flow limit. When the compressor mass flow limit is reached or anticipated to be reached by the actual compressor mass flow, the engine is governed to cause an alternative compressor mass flow at step 208. The alternative compressor mass flow is a predetermined setting for the mass flow that should not be exceeded in order to maintain aerodynamic stability. For example, the alternative compressor mass flow may be the compressor mass flow limit. In another embodiment, the alternative compressor mass flow may be a value that is close to or approximately equivalent to the compressor mass flow limit, for example ±1% of the limit, ±2%, ±3%, or any other suitable value known to maintain operation of the compressor below the surge margin. When the actual compressor mass flow is less than the compressor mass flow limit, the method 200 is repeated and operation of the engine continues normally. When the compressor mass flow limit is reached or anticipated to be reached or exceeded, governing of the engine is modified. In some embodiments, an upcoming mass flow may be anticipated based on slopes/trends of previous values, for example, to ensure the limit is never exceeded. It will be understood that these predictions are performed in real-time and used to anticipate an imminent exceeding of the compressor mass flow limit. Alternatively, a lower compressor mass flow limit may be used to ensure that the "true" compressor mass flow limit is never exceeded.

In some embodiments, the governing of the engine is modified by limiting a power of the aircraft engine, for example by applying a power limit to a power control algorithm of the engine controller 110. Power of the engine may also be controlled through one or more power-related parameters, such as but not limited to fuel flow, airflow, and the like. In some embodiments, governing of the engine is modified by limiting a rotational speed of the compressor, for example by applying a speed limit, by managing fuel flow to the engine, by changing the position of one or more guide vane, or any other parameter having an impact on engine speed. Any other controllable engine parameter may be modified to ensure that the compressor mass flow does not exceed the alternative compressor mass flow.

Figure 3A:
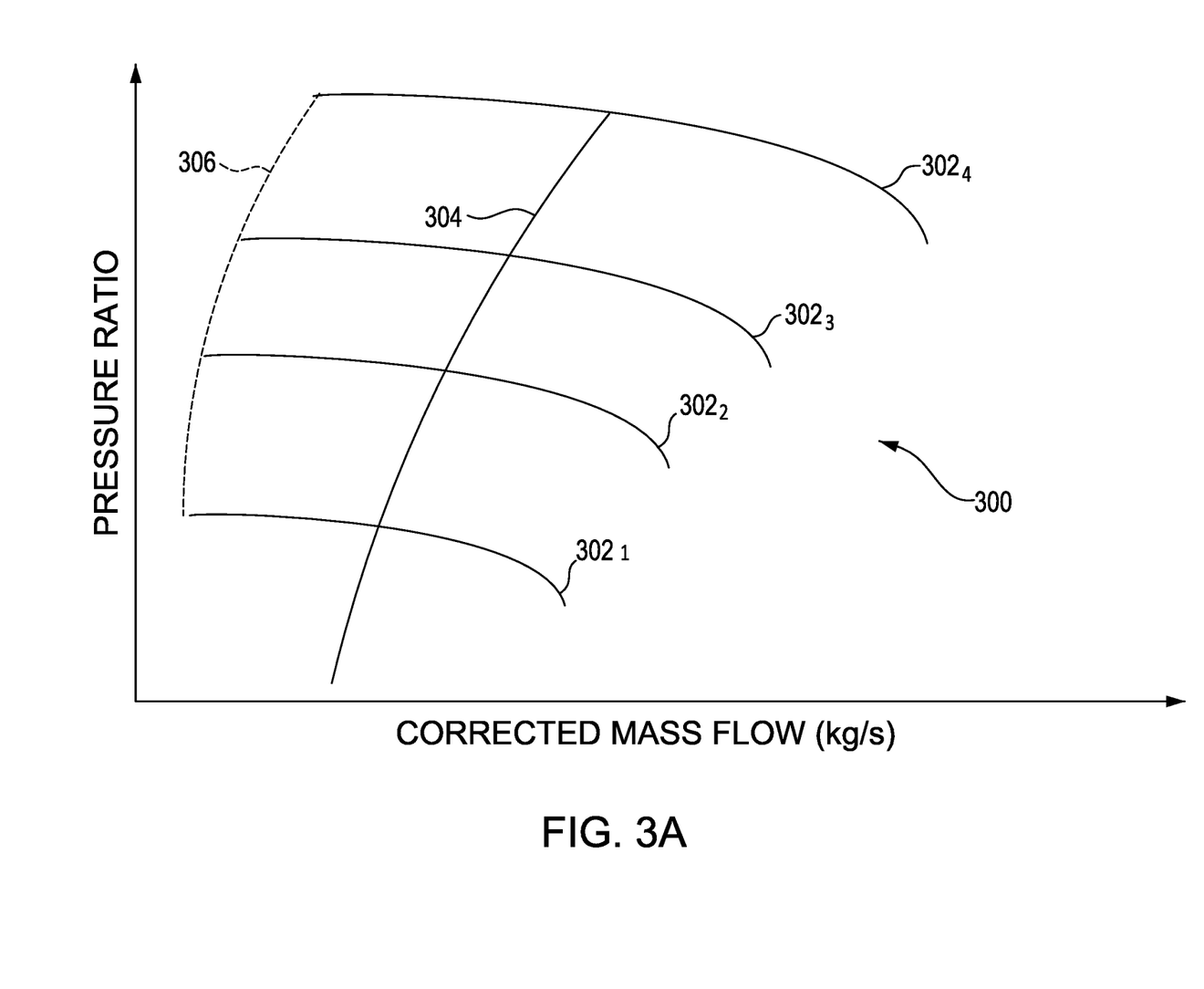
FIG. 3A is an example of a compressor map.

With additional reference to FIG. 3A, the fluid dynamics of the compressor can be represented in a compressor map 300. In this example, the behavior of the compressor is expressed as pressure ratio vs corrected mass flow for a plurality of compressor rotational speeds at a given aircraft altitude. The pressure ratio is a ratio of compressor exit pressure to compressor inlet pressure ($P_{exit}/P_{inlet}$). Corrected compressor mass flow is known as Q and is the uncorrected compressor mass flow W corrected to account for temperature and pressure conditions of the compressor as follows:

$$Q = W\sqrt{T}/p \qquad (1)$$

Each curve $302_1$-$302_4$ represents the compressor behavior at a given operating speed, for example 50% ($302_1$), 73% ($302_2$), 87% ($302_3$), and 100% ($302_4$) of the maximum operating speed of the compressor. In another example, the curves $302_1$-$302_4$ represent the compressor behavior at 60% ($302_1$), 70% ($302_2$), 80% ($302_3$), and 95% ($302_4$) of a reference operating speed of the compressor, such as but not limited to a maximum operating speed. The compressor behavior may be expressed for more than four speeds, and with different values of operating speeds. Curve 304 corresponds to an example operating line for the compressor, while curve 306 corresponds to a surge line. The surge line is the operating point of the compressor to be avoided (i.e. by remaining below) in order to prevent an engine surge. Compressors are thus operated below the surge line, in accordance with a desired surge margin (i.e. distance between the operating line and the surge line).

In some embodiments, the compressor mass flow limit corresponds to the surge line 306 for the given operating parameters of the engine 100. A plurality of compressor maps 300 may be provided, each one corresponding to a different set of operating parameters, including but not limited to altitude of the aircraft, temperature and/or pressure at the inlet and/or outlet of the engine and/or compressor, and rotational speed of the compressor and/or engine. Determining the compressor mass flow limit as per step 202 may comprise selecting the suitable compressor map based on the actual engine operating parameters and using the surge line 306.

Figure 3B:
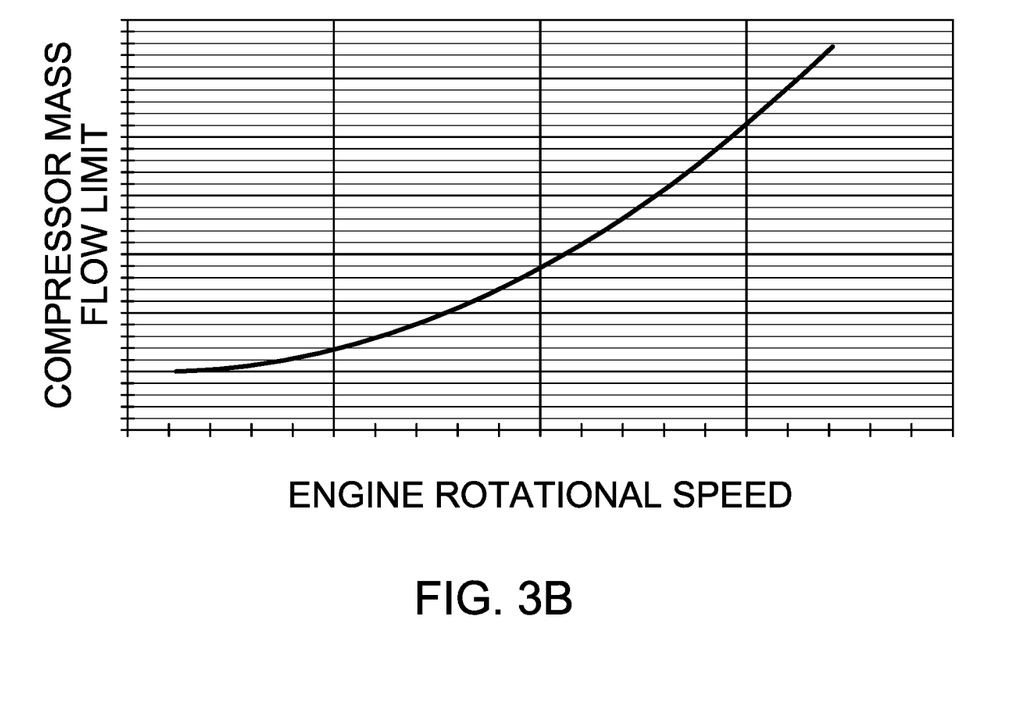
FIG. 3B is an example of a compressor mass flow limit based on engine rotational speed.
Figure 3C:
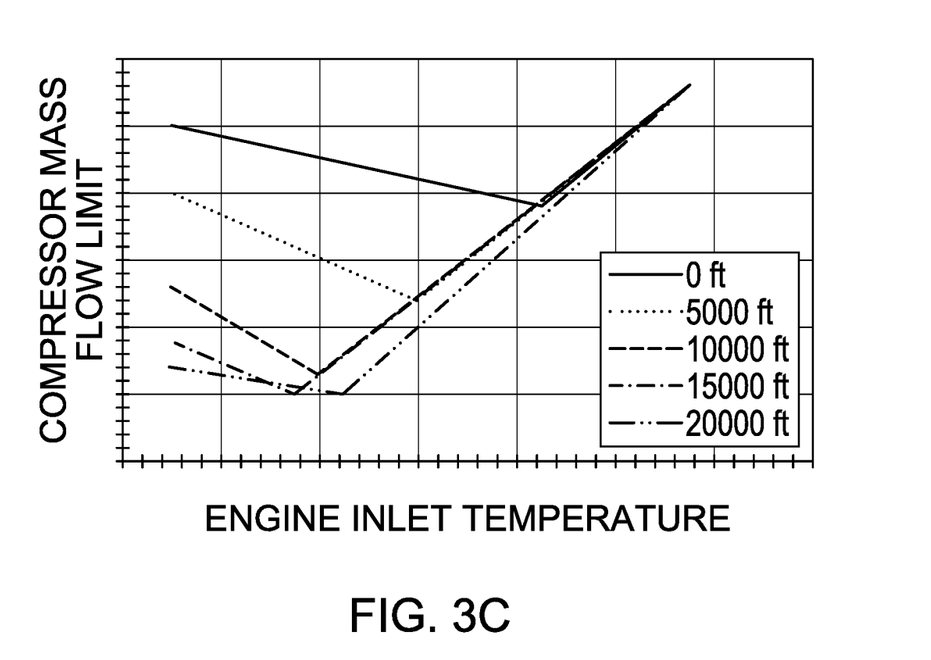
FIG. 3C is an example of a compressor mass flow limit based on engine inlet temperature and aircraft altitude.

The compressor mass flow limit may also be expressed directly as a function of one or more engine operating parameter. Examples are shown in FIGS. 3B-3C. In FIG. 3B, the compressor mass flow limit is expressed for various engine rotational speeds. In FIG. 3C, the compressor mass flow limit is expressed for various engine inlet temperatures at a plurality of different altitudes. It will be understood that the relationship between the compressor mass flow limit and the operating parameters of the engine may be represented using various combinations of parameters. This relationship may be predetermined, using testing or simulation, and can vary as a function of various specifications of the engine 100, such as but not limited to engine type (turbofan, turboshaft, turboprop, etc.), engine architecture (e.g. number of shafts, compressor stages, variable geometries, etc.) or engine operability/performance requirements. In some embodiments, determining the compressor mass flow limit as per step 202 comprises computing the compressor mass flow limit from the predetermined relationship using the actual engine operating parameters. For example, the compressor mass flow limit may be computed from a function that represents the relationship between the actual operating parameters of the engine and the compressor mass flow for a given surge margin. In some embodiments, determining the compressor mass flow limit as per step 202 comprises selecting the compressor mass flow limit from a multi-dimensional lookup table defining various compressor mass flow limits for a given set of engine operating parameters. Other embodiments may also be used depending on practical implementation.

Figure 4:
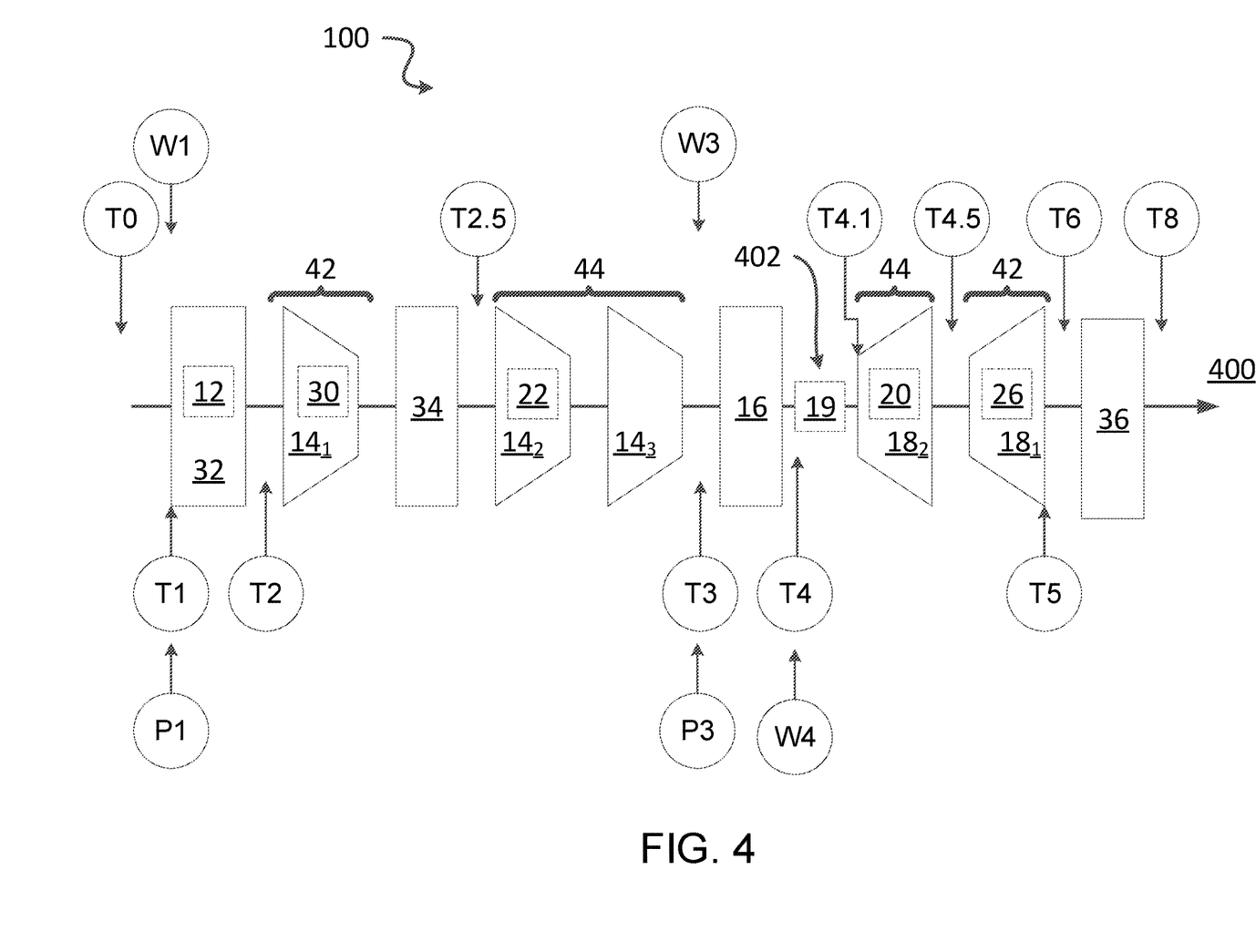
FIG. 4 is a schematic side view of a gas turbine engine showing example temperature and pressure evaluation locations.

FIG. 4 illustrates the engine 100 schematically as having multiple elements forming a gas path along which gas flows from the inlet 32 to the exhaust 36 of the engine 100. The engine 100 includes two spools, namely a low-pressure spool 42, and a high-pressure spool 44. It should be noted that the while the description of FIG. 4 pertains to an embodiment of the engine 100 which includes multiple spools, namely the low- and high-pressure spools 42, 44, the present disclosure may be applied to other types of engines, including engines with only one spool, or with more than two spools, as appropriate.

The low-pressure spool 42 includes a low-pressure compressor stage $14_1$, which includes the LP compressor rotor(s) 30, and a low-pressure turbine $18_1$, which includes the LP turbine rotors(s) 26. In other embodiments of the engine 100, the low-pressure spool 42 can include more than one compressor and/or turbine stages. The high-pressure spool 44 includes two high-pressure compressor stages $14_2$ and $14_3$ which include the HP compressor rotor(s) 22, and a high-pressure turbine $18_2$, which includes the HP turbine rotor(s) 20. In other embodiments of the engine 100, the high-pressure spool 44 can include only one compressor and/or turbine stages, or more than two compressor and/or turbine stages. In the illustrated embodiment, an inter-compressor case (ICC) 34 is disposed between the low-pressure compressor stage $14_1$ and the high-pressure compressor stage $14_2$.

As fluids, for instance a gas mixture, pass through the engine 100, they undergo numerous pressure and temperature changes. Example temperature measurement locations for the flow of the gas mixture along the gas path 400 are illustrated in FIG. 4. It should be understood that the present disclosure relating to temperatures and pressures measurable within the engine 100 is not exhaustive, and various physical and/or virtual sensors may be deployed within the engine 100 to assess other values for other locations within the engine 100. T0, taken upstream of the inlet 32, refers to an ambient temperature of the environment surrounding the engine 100. Although illustrated here as being captured upstream of the inlet 32, it should be understood that the ambient temperature T0 can be captured at any suitable location in the environment in which the engine 100 is operating.

T1 refers to an inlet temperature, taken at the inlet 32 of the engine 100, just as the air from the environment enters through the fan rotor 12. P1 refers to an inlet pressure, taken at the same or similar location as T1. W1 refers to a mass flow at the inlet of the engine. T2 refers to a low-pressure compressor inlet temperature, taken before the LP turbine rotor(s) 26 of the low-pressure compressor stage $14_1$. T2.5 refers to a high-pressure compressor temperature, taken between the ICC 34 and the high-pressure compressor stage $14_2$. T3 and P3 refer to high-pressure compressor delivery temperature and pressure, respectively, taken after the high-pressure compressor stages $14_2$ and $14_3$, for instance after the HP compressor rotor(s) 22. For a dual-spool engine as illustrated in FIG. 4, the compressor outlet flow rate is referred to as W3 and includes locations immediately around and close to W3 that may be used as a proxy for the location of W3.

T4 refers to a combustor outlet temperature, taken before the HP turbine rotor(s) 20, and after the combustor 16. T4.1 refers to a temperature taken at or near an entry to the high-pressure turbine $18_2$. Measurements for T4.1 can serve as a proxy for T4 because the exit of the combustor (where T4 is taken) and the entry to the high-pressure turbine $18_2$ (where T4.1 is taken) are connected to one another. T4.5 refers to a temperature taken between the high-pressure turbine $18_2$ and the low-pressure turbine $18_1$. T5 refers to the turbine outlet temperature, taken after the LP turbine rotor(s) 26 of the low-pressure turbine $18_1$. T6 refers to an exhaust gas temperature, taken between the low-pressure turbine $18_1$ and the exhaust 36. T8 refers to an exhaust gas temperature, taken at the outlet of the exhaust 36.

As stated above, the actual compressor mass flow used at step 204 may be the corrected mass flow at the outlet of the compressor, Q3, as follows:

$$Q_3 = W_3 \sqrt{T_3}/P_3 \tag{2}$$

The mass flow at the outlet of the compressor W3 may be computed from the mass flow at the inlet of the engine W1 as follows:

$$W_3 = W_1 - \text{Air losses}_1 \tag{3}$$

The air losses may be estimated based on certain known or estimated engine parameters, such as handling bleeds and the air system of the engine. In some embodiments, W1 is measured using one or more sensors, such as a flowrate sensor. Alternatively, W1 is determined using an iterative method for predicting T4, as described in U.S. patent application Ser. No. 16/906,637, the contents of which are hereby incorporated by reference in their entirety. The iterative method is based on the relationship in equation (1), which also holds true for Q4 as follows:

$$Q_4 = W_4 \sqrt{T_4}/P_4 \tag{4}$$

Through the iterative process, the algorithm converges to a value for W1, which can then be used in equation (3) to compute W3. The computed value for Q3 and measured or computed values for P3 and T3 are used in equation (2) to find Q3.

Figure 5A:
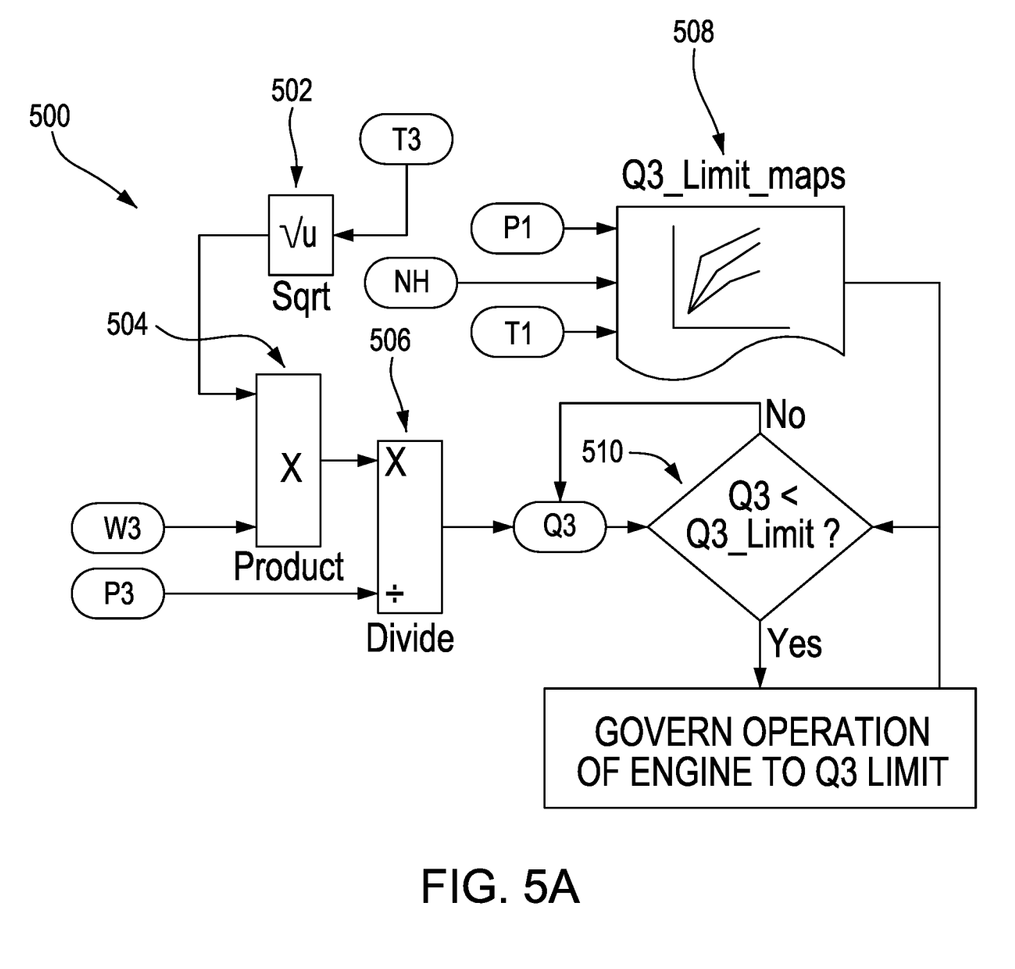
FIGS. 5A-5B are example logic diagrams for implementing the method of FIG. 2.
Figure 5B:
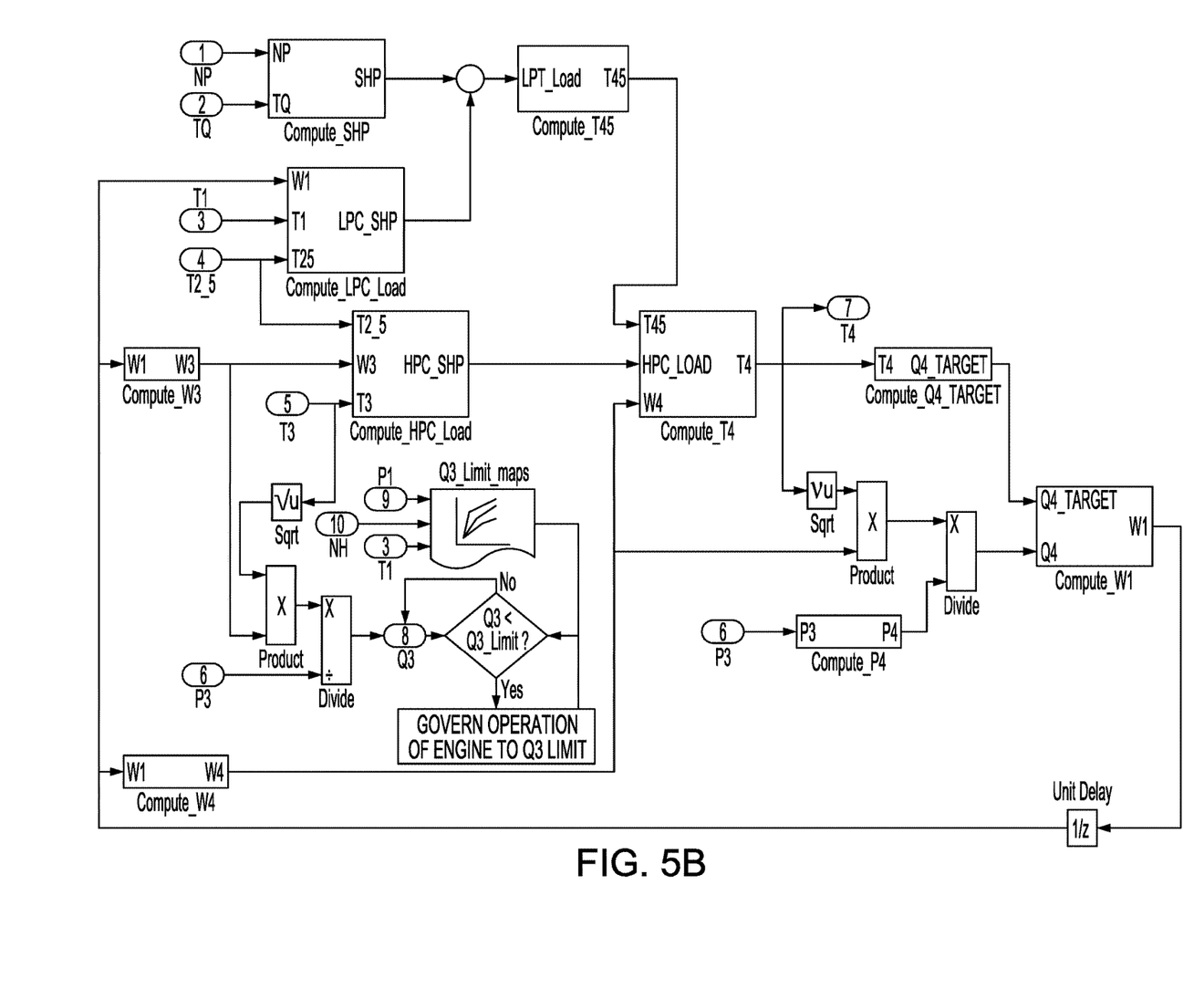

An example implementation of the method 200 is shown in the logic diagram 500 of FIG. 5A. FIG. 5B is an example implementation of the method 200 which includes using the iterative method as described in U.S. patent application Ser. No. 16/906,637 to find W1. With reference to FIG. 5A, blocks 502, 504, and 506 represent mathematical operations, namely a square-root, a product, and a division operation, respectively, used to implement equation (2) in order to compute the actual Q3, from T3, P3, and W3. Engine operating parameters P1, engine speed (NH) and T1 are used to select a Q3 limit at 508. The computed Q3 is compared to the Q3 limit at 510. When the computed Q3 is below the Q3 limit, operation of the engine continues normally. When the computed Q3 is greater than or equal to the Q3 limit, the engine is governed to remain at the Q3 limit.

It will be understood that the method 200 may be used instead of, or complementary to, alternative solutions to govern engine operation to prevent high speed stall/surge, which rely on a corrected compressor speed. Compressor corrected flow is generally proportional to corrected compressor speed along a given operating line. However, the relationship between compressor corrected speed and compressor inlet or exit corrected flow is not equivalent across the altitude and ambient/inlet temperature operating envelope. There can also be additional differences throughout the life of the engine, as wear and tear on the engine affects engine behavior. Due to this discrepancy, alternative solutions based on corrected compressor speed use conservative limits, and engine power is thus limited in circumstances where the compressor may have sufficient margin to its aerodynamic stability limit to provide more power, for example at lower altitudes. In contrast, using a compressor mass flow limit instead of a compressor speed limit allows a minimum surge margin requirement to be met at all altitudes. In some embodiments, using the compressor flow limit as described herein can provide up to 4% more engine power in a significant portion of a flight envelope, which is non-negligible.

Figure 6:
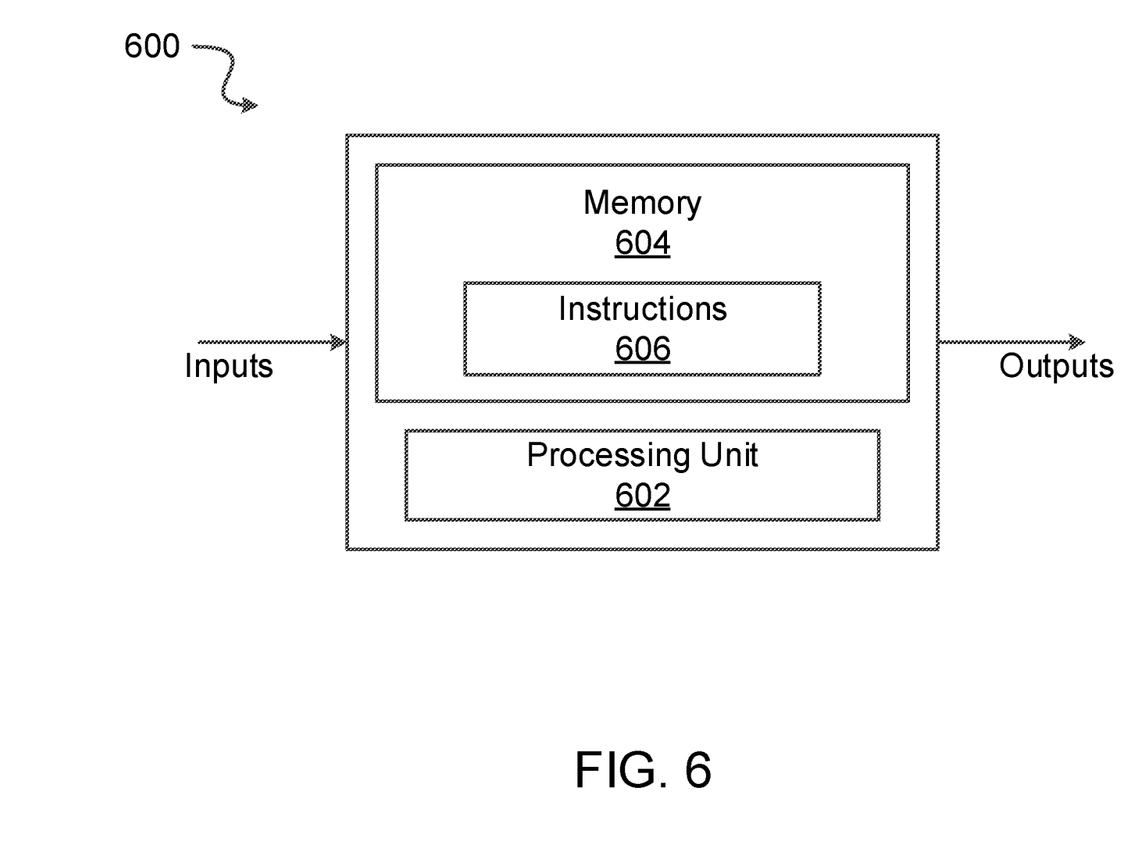
FIG. 6 is a block diagram of an example computing device.

With reference to FIG. 6, there is illustrated an embodiment of a computing device 600 for implementing part or all of the method 200 described above, for example using the logic diagram 500 of FIG. 5A. The computing device 600 can be used to perform part or all of the functions of the engine controller 110 of the engine 100. In some embodiments, the engine controller 110 is composed only of the computing device 600. In some embodiments, the computing device 600 is within the engine controller 110 and cooperates with other hardware and/or software components within the engine controller 110. In both cases, the engine controller 110 performs the method 200. In some embodiments, the computing device 600 is external to the engine controller 110 and interacts with the engine controller 110. In some embodiments, some hardware and/or software components are shared between the engine controller 110 and the computing device 600, without the computing device 600 being integral to the engine controller 110. In this case, the engine controller 110 can perform part of the method 200.

The computing device 600 comprises a processing unit 602 and a memory 604 which has stored therein computer-executable instructions 606. The processing unit 602 may comprise any suitable devices configured to cause a series of steps to be performed such that instructions 606, when executed by the computing device 600 or other programmable apparatus, may cause the functions/acts/steps specified in the method 300 described herein to be executed. The processing unit 602 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 602.

It should be noted that the computing device 600 may be implemented as part of a FADEC or other similar device, including an electronic engine control (EEC), engine control unit (EUC), engine electronic control system (EECS), an Aircraft Avionics System, and the like. In addition, it should be noted that the techniques described herein can be performed by a computing device 600 substantially in real-time.

The methods and systems described herein may be implemented in a high level procedural or object oriented programming or scripting language, or a combination thereof, to communicate with or assist in the operation of a computer system, for example the computing device 600. Alternatively, the methods and systems described herein may be implemented in assembly or machine language. The language may be a compiled or interpreted language. Program code for implementing the methods and systems for monitoring a temperature of a gas turbine engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, temperature and/or pressure measurements for the outlet of the compressor may be derived from temperature and/or pressure measurements for the inlet of the compressor. Yet further modifications could be implemented by a person of ordinary skill in the art in view of the present disclosure, which modifications would be within the scope of the present technology.

The invention claimed is:

1. A method for operating an aircraft engine having a compressor, the method comprising:

determining, based on actual operating parameters of the aircraft engine, a corrected compressor mass flow limit at an outlet of the compressor for an aerodynamic stability of the aircraft engine;

determining a corrected actual mass flow at the outlet of the compressor of the aircraft engine, wherein the corrected actual mass flow at the outlet of the compressor is based on measured values of the aircraft engine;

comparing the corrected actual mass flow at the outlet of the compressor to the corrected compressor mass flow limit at the outlet of the compressor; and governing operation of the aircraft engine to cause an alternative compressor mass flow when the corrected actual mass flow at the outlet of the compressor reaches or is anticipated to reach the corrected compressor mass flow limit at the outlet of the compressor;

wherein:
determining the corrected compressor mass flow limit at the outlet of the compressor comprises selecting the corrected compressor mass flow limit at the outlet of the compressor from a multi-dimensional map defining the corrected compressor mass flow limit at the outlet of the compressor as a function of an engine inlet pressure, an engine inlet temperature, and an engine rotational speed of the aircraft engine; and determining the corrected actual mass flow at the outlet of the compressor comprises obtaining an actual mass flow at an inlet of the aircraft engine and estimating the actual mass flow at the outlet of the compressor based on the actual mass flow at the inlet of the aircraft engine.

2. The method of claim 1, wherein the alternative compressor mass flow is the corrected compressor mass flow limit at the outlet of the compressor.

3. The method of claim 1, wherein the governing of the operation of the aircraft engine comprises at least one of limiting a power of the aircraft engine and limiting a rotational speed of the aircraft engine.

4. The method of claim 3, wherein the limiting of the rotational speed comprises limiting a rotational speed of high pressure rotors of the compressor.

5. The method of claim 1, wherein the corrected actual mass flow Q3 at the outlet of the compressor is calculated from:

$$Q3 = W3 * \frac{\sqrt{T3}}{P3};$$

where W3 is an uncorrected mass flow at the outlet of the compressor, T3 is a temperature at the outlet of the compressor, and P3 is a pressure at the outlet of the compressor.

6. A system for operating an aircraft engine having a compressor, the system comprising:
a processing unit; and
a non-transitory computer-readable medium having stored thereon program instructions executable by the processing unit for:
determining, based on actual operating parameters of the aircraft engine, a corrected compressor mass flow limit at an outlet of the compressor for an aerodynamic stability of the aircraft engine;

determining a corrected actual mass flow at the outlet of the compressor of the aircraft engine, wherein the corrected actual mass flow at the outlet of the compressor is based on measured values of the aircraft engine;

comparing the corrected actual mass flow at the outlet of the compressor to the corrected compressor mass flow limit at the outlet of the compressor; and governing operation of the aircraft engine to cause an alternative compressor mass flow when the corrected actual mass flow at the outlet of the compressor reaches or is anticipated to reach the corrected compressor mass flow limit at the outlet of the compressor;

wherein:
determining the corrected compressor mass flow limit at the outlet of the compressor comprises selecting the corrected compressor mass flow limit at the outlet of the compressor from a multi-dimensional map defining the corrected compressor mass flow limit at the outlet of the compressor as a function of an engine inlet pressure, an engine inlet temperature, and an engine rotational speed of the aircraft engine; and determining the corrected actual mass flow at the outlet of the compressor comprises obtaining an actual mass flow at an inlet of the aircraft engine and estimating the actual mass flow at the outlet of the compressor based on the actual mass flow at the inlet of the aircraft engine.

7. The system of claim 6, wherein the alternative compressor mass flow is the corrected compressor mass flow limit at the outlet of the compressor.

8. The system of claim 6, wherein the governing of the operation of the aircraft engine comprises at least one of limiting a power of the aircraft engine and limiting a rotational speed of the aircraft engine.

9. The system of claim 8, wherein the limiting of the rotational speed comprises limiting a rotational speed of high pressure rotors of the compressor.

10. The system of claim 6, wherein the corrected actual mass flow Q3 at the outlet of the compressor is calculated from:

$$Q3 = W3 * \frac{\sqrt{T3}}{P3};$$

where W3 is an uncorrected mass flow at the outlet of the compressor, T3 is a temperature at the outlet of the compressor, and P3 is a pressure at the outlet of the compressor.

* * * * *